US007478237B2

(12) United States Patent
Costea et al.

(10) Patent No.: US 7,478,237 B2
(45) Date of Patent: Jan. 13, 2009

(54) SYSTEM AND METHOD OF ALLOWING USER MODE APPLICATIONS WITH ACCESS TO FILE DATA

(75) Inventors: Mihai Costea, Redmond, WA (US);
David Allen Goebel, Seattle, WA (US);
Adrian M Marinescu, Sammamish, WA (US); Anil Francis Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 10/984,207

(22) Filed: Nov. 8, 2004

(65) Prior Publication Data
US 2006/0101263 A1 May 11, 2006

(51) Int. Cl.
*H04L 9/00* (2006.01)
*H04L 9/32* (2006.01)
*G06F 11/30* (2006.01)
(52) U.S. Cl. .................. 713/164; 713/165; 713/166; 713/167; 726/26; 726/27; 726/28; 726/29; 726/30
(58) Field of Classification Search .................. 713/164
See application file for complete search history.

(56) References Cited

U.S. PATENT DOCUMENTS

| 7,043,758 | B2 * | 5/2006 | Grupe ......................... 726/24 |
| 7,216,366 | B1 * | 5/2007 | Raz et al. ..................... 726/24 |
| 2001/0020245 | A1 * | 9/2001 | Golds et al. .................. 709/102 |
| 2006/0143604 | A1 * | 6/2006 | Riley ........................... 717/172 |

OTHER PUBLICATIONS

"Blue Coat Rolls Out Web Anti-Virus Appliance," *eWeek*, NA, Jun. 21, 2004, © 2004 Ziff Davis Media Inc., <http://www.dialogweb.com/cgi/document?dockKey=33-275-2806461&docFormat=full&form...> [retrieved Aug. 25, 2004] 2 pages.
Landesman, M., "Bigger Threats, Better Defense: We Test 16 Security Tools That Aim to Foil Worms, Viruses, Spies, and Hackers," *PC World* 22(6):74-78, Jun. 2004, <http://www.dialogweb.com/cgi/document?dockKey=223-275-2787274&docFormat=full&form...> [retrieved Aug. 25, 2004].
Luhn, R., "Install-and-Forget Antivirus Programs," *PC World* 20(11):70-71, Nov. 2002, <http://www.dialogweb.com/cgi/document?dockKey=130-275-2652955&docFormat=full&form...> [retrieved Aug. 25, 2004].
Wagner, M., "Anti-Virus Vendors Gear Up for Next-Generation Infections," *InternetWeek*, NA, Jan. 15, 2003, <http://www.dialogweb.com/cgi/document?dockKey=106-275-2683240&docFormat=full&form...> [retrieved Aug. 25, 2004] 4 pages.

* cited by examiner

*Primary Examiner*—Longbit Chai
(74) *Attorney, Agent, or Firm*—Amin, Turocy & Calvin, LLP (57) ABSTRACT

In accordance with this invention, a system, method, and computer-readable medium that aggregates the knowledge base of a plurality of antivirus software applications are provided. User mode applications, such as antivirus software applications, gain access to file system operations through a common information model, which obviates the need for antivirus software vendors to create kernel mode filters. When file system operations are available to antivirus software applications, the present invention may cause each antivirus software application installed on a computing device to perform a scan to determine if the data is malware.

28 Claims, 6 Drawing Sheets

| FILEINDX | FIRST BIT | SECOND BIT |
|---|---|---|
| 0X1001 | 1 | 0 |
| 0X1002 | 1 | 0 |
| 0X1003 | 1 | 0 |
| 0X1004 | 0 | 1 |
| 0X1005 | 0 | 0 |

SYSTEM AND METHOD OF ALLOWING USER MODE APPLICATIONS WITH ACCESS TO FILE DATA

FIELD OF THE INVENTION

The present invention relates to computing devices and, more particularly, to protection of computing devices against malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all malicious computer programs that spread on computer networks, such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other systems.

A traditional defense against computer malware and, particularly, against computer viruses and worms, is commercially available antivirus software applications. Generally described, an antivirus software application scans data, looking for identifiable patterns associated with computer malware. Upon detecting a pattern associated with computer malware, the antivirus software application may respond by quarantining the malware or deleting the malware. Unfortunately, antivirus software applications typically work best with known, identifiable computer malware. Frequently, this is done by matching patterns within data to what is referred to as a "signature" of the malware.

Typically, most operations performed by existing antivirus software applications occur when an operating system is in "user mode." As is known to those skilled in the art and others, computer programs such as antivirus software applications may execute in either "kernel mode" or "user mode." "Kernel mode" refers to processing that occurs at the most privileged and protected level of the operating system. Kernel mode programs reside in protected memory at all times and provide basic operating system services. "User mode" refers to processing that occurs at the application layer where access to kernel mode data is not available. Previously a vendor of an antivirus software application that needed to access information and features available from kernel mode needed to build a kernel mode filter that interfaced with an operating system. Unfortunately, each antivirus software vendor was required to develop a unique filter to access features available from kernel mode, such as the input/output (hereinafter referred to as "I/O"), scheduled to occur on a computing device. Moreover, if each antivirus software application has a corresponding kernel mode filter to perform essentially the same task, a computing device suffers the performance burden of having duplicative code executing in several disparate filters all loaded in the kernel. Still another disadvantage of existing technologies is that the user mode interface is inconsistent, non-uniform, and prone to errors. Accordingly, a need exists for a mechanism by which I/O scheduled to occur on a computing device is available to antivirus software applications without requiring an antivirus software vendor to implement a kernel mode filter.

Numerous software vendors market antivirus software applications and maintain an ever-growing database of malware signatures. In fact, one of the most important assets of antivirus software vendors is the knowledge base of signatures collected from known malware. However, commercially available antivirus software applications are not always compatible with each other. For example, in some instances, when two different antivirus software applications are installed on a computing device, data conflicts are known to occur. As a result, users are unable to install multiple antivirus software applications on a computing device and receive the benefit of each application's knowledge base. Accordingly, a need exists for a mechanism to aggregate the knowledge base of a plurality of antivirus software applications installed on the same computing device.

SUMMARY OF THE INVENTION

The present invention addresses the above identified needs by providing a mechanism for aggregating the knowledge base of a plurality of antivirus software applications to determine if data associated with a computing device is malware. One aspect of the present invention is a method that permits antivirus software applications to access data associated with I/O requests through a common information model. The common information model obviates the need for antivirus software vendors to create kernel mode filters by providing the features that are typically available from kernel mode filters. Then the common information model may cause the antivirus software applications to scan data associated with a computing device to determine if the data is malware. When malware is detected, any attempt to read, store, or execute the malware is prevented.

Another aspect of the present invention is a method that determines if a file associated with a computing device was previously identified as malware or previously established to be safe. This aspect of the present invention includes associating a variable with a file when one or more antivirus software applications scans the file. The variable indicates whether the file is malware and may be recalled at a later time. For example, the variable may be recalled when a user attempts to execute the file. If the variable indicates that the file is malware, any attempt to execute the file by the user fails. Conversely, if the variable indicates that the file is not malware, an attempt to execute the file will succeed without requiring antivirus software applications to perform duplicative scans of the file.

Another aspect of the present invention is a highly efficient method for allowing antivirus software applications to access file data. This aspect of the present invention includes creating a file mapping section object that will be used to perform a scan by one or more antivirus software applications. Then a user mode application that interfaces with antivirus applications is provided with data that may be used to access the file mapping section object. Finally, a view of the file that may be accessed by antivirus software applications is generated. This aspect of the present invention provides a basic set of file system operations to antivirus software applications that improves the speed in which scanning is performed.

In yet another embodiment of the present invention, a computing device is provided that aggregates the knowledge base of a plurality of antivirus software applications. The computing device includes a security service application, one or more antivirus software applications, and a generalized security filter that includes a scan cache and a data mapping module. The generalized security filter and the security service application collectively function to provide a common information model to the antivirus software applications. The common information model allows antivirus software applications to access I/O requests scheduled to occur on the computing device. When an I/O request is intercepted, the antivirus software applications may interact with the common information model to schedule a scan. When scans occur, the security service application is aware of the different antivirus software applications installed on the computing device and is able to prevent data conflicts.

In still another embodiment, a computer-readable medium is provided with contents, i.e., a program that causes a computing device to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In accordance with this invention, a system, method, and computer-readable medium that aggregate the knowledge base of a plurality of antivirus software applications is provided. User mode applications such as antivirus software applications are provided with access to file system operations such as I/O requests through a common information model, which obviates the need for antivirus software vendors to create kernel mode filters. When an I/O request is intercepted, the present invention may cause each antivirus software application installed on a computing device to perform a scan to determine if data associated with the request is malware. Although the present invention will be described in the context of antivirus software applications, those skilled in the relevant art and others will appreciate that the present invention is also applicable to other areas of software development. Accordingly, the described embodiments of the present invention should be construed as illustrative in nature and not as limiting.

Figure 1:
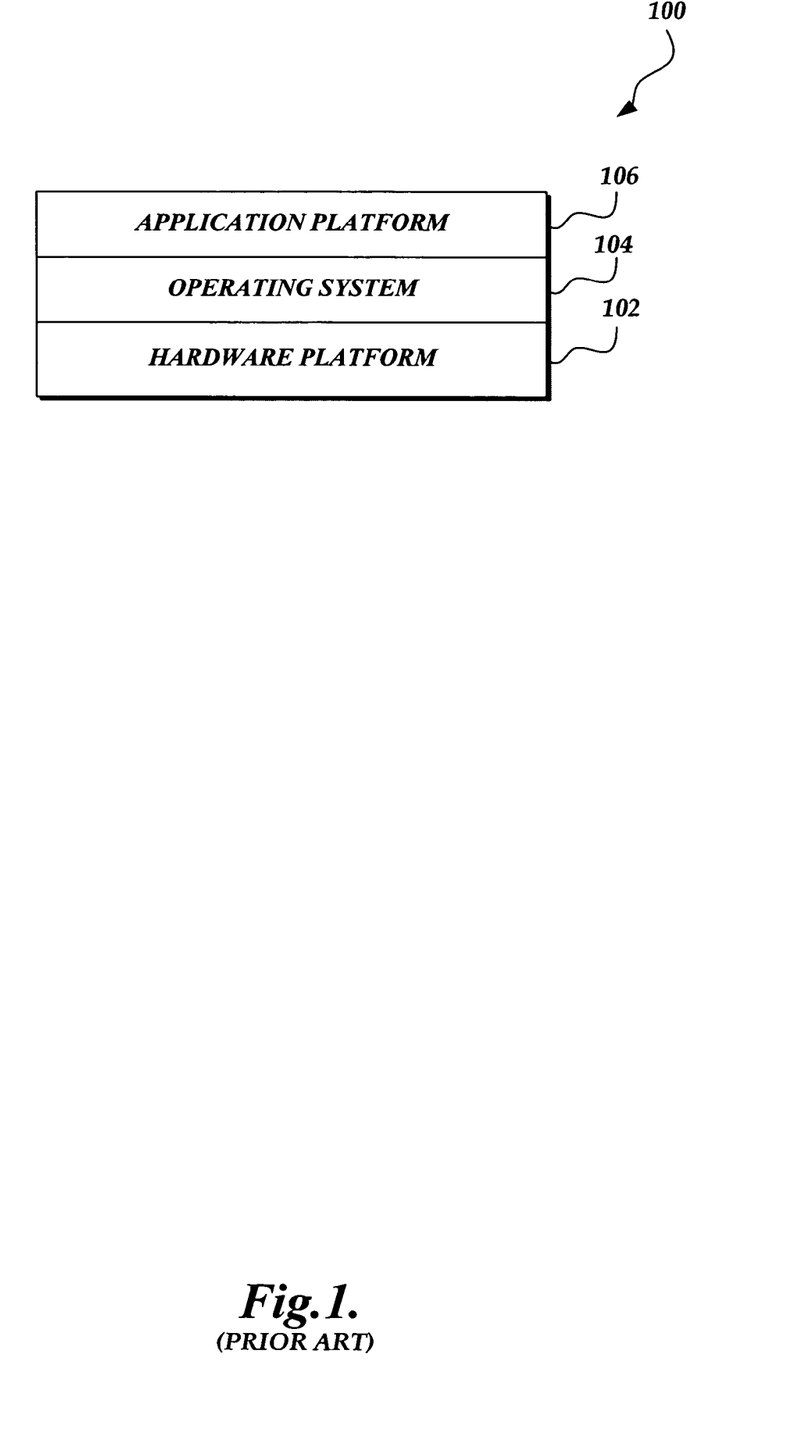
FIG. 1 is a block diagram illustrating the hierarchical structure of a computing device in accordance with the prior art.

FIG. 1 is a block diagram of a computing device 100 configured in accordance with the prior art. The computing device 100 may be any one of a variety of devices including, but not limited to, personal computing devices, server-based computing devices, personal digital assistants, cellular telephones, other electronic devices having some type of memory, and the like. For ease of illustration and because they are not important for an understanding of the present invention, FIG. 1 does not show the typical components of many computing devices, such as a keyboard, a mouse, a printer or other I/O devices, a display, etc.

The computing device 100 illustrated in FIG. 1 includes a hardware platform 102, an operating system 104, and an application platform 106. For ease of illustration and because they are not important to an understanding of the present invention, FIG. 1 does not show the components typically included in the hardware platform 102, such as a central processing unit, memory, hard drive, etc. Also, for similar reasons, FIG. 1 does not show any components of the operating system 104 or the application platform 106.

As shown in FIG. 1, the components of computing device 100 are layered with the hardware platform 102 on the bottom layer and the application platform 106 on the top layer. The layering of FIG. 1 illustrates that, preferably, the present invention is embodied in a hierarchical environment. Each layer included in the computing device 100 is dependent on systems in lower layers. More specifically, the application platform 106 runs on top of the operating system 104 and is not able to directly access components of the hardware platform 102. Instead, any access to the hardware platform 102 by the application platform 106 is managed by the operating system 104. As known to those skilled in the art and others, the operating system 104 provides an application programming interface ("API") to the application platform 106 that defines the services available to the application platform 106.

Figure 2:
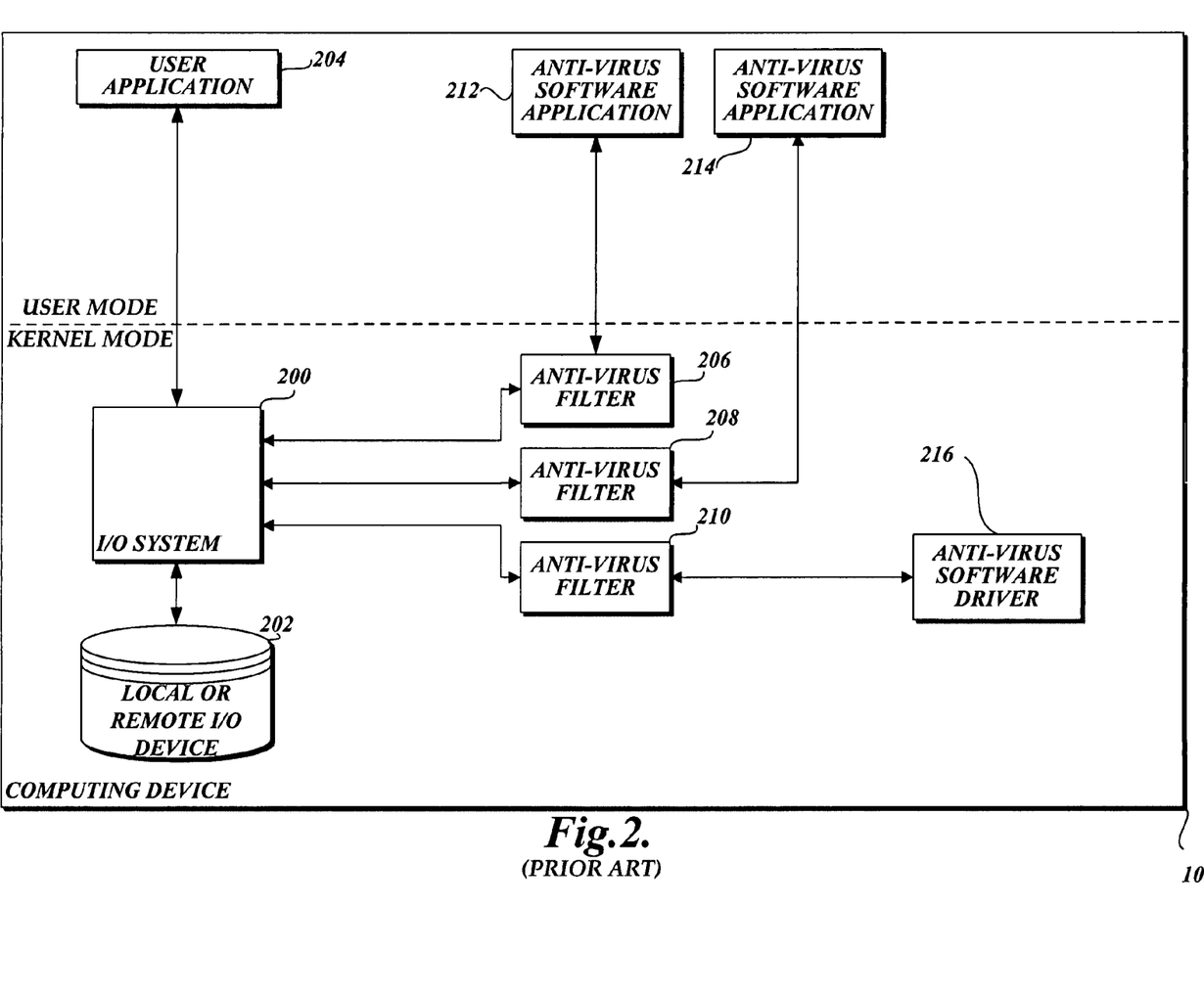
FIG. 2 is a block diagram of the components of a computing device that includes antivirus software applications suitable to scan for malware in accordance with the prior art.

FIG. 2 is a block diagram suitable to illustrate the prior art process of providing antivirus software applications with access to data associated with an I/O request. As known to those skilled in the art and others, computer users have on-going needs to read and write data to memory devices, such as hard drives, floppy disks, random access memory, compact disks ("CDs"), etc. For example, a common operation provided by most software applications is to open a file stored on a memory device and display the contents of the file on a computer display. However, since opening a file may cause malware associated with the file to be executed, antivirus software applications typically perform a scan or other analysis of a file before the open operation is satisfied. If malware is detected, the antivirus software application that performed the scan may prevent the malware from being executed, for example, by causing the open operation to fail. Also, an antivirus software application may present a computer user with options for removing the malware or placing the malware in a "quarantine."

As known to those skilled in the art and others, I/O requests made in a computing device are handled by a component of the operating system 104 (FIG. 1) known as an I/O system. In order to protect a computing device against malware, antivirus software applications are notified when I/O requests are received. With reference now to FIG. 2, the known process of providing antivirus software applications with access to data associated with an I/O request will be described. The computing device 100 illustrated in FIG. 2 includes an I/O system 200, a local or remote I/O device 202, a user application 204, antivirus filters 206-210, and antivirus software applications/drivers 212-216 residing in either user or kernel mode. When a request to perform I/O is generated from a user application, such as the user application 204, the I/O system 200 receives the request. As illustrated in FIG. 2, user applications operate in user mode and generate I/O requests that are satisfied by the I/O system 200 in kernel mode. Prior to a request being satisfied, the antivirus filters 206, 208, and 210 may be notified that an I/O request is scheduled to be satisfied. In response, the antivirus filters 206, 208, and 210, may each notify their respective antivirus software applications/drivers 212, 214, and 216 that data associated with the I/O request should be scanned. If data associated with the I/O request is malware, the antivirus software application/driver may be configured to prevent the I/O request from being satisfied. Conversely, if an I/O request does not involve malware, the I/O system 200 causes the I/O request to be satisfied. For example, the I/O system 200 may cause data to be written to I/O device 202 that, in some systems, is a local hardware device such as a hard drive, floppy disk, flash memory, tape drive, compact disk ("CD"), etc. Alternatively, the I/O device 202 may be a remote hardware device connected to the computing device 100 through a network connection.

Unfortunately, the prior art process illustrated in FIG. 2 of providing antivirus software applications access to data associated with an I/O request has the disadvantage of requiring antivirus software vendors to each develop a kernel mode filter. As illustrated in FIG. 2, antivirus filters 206, 208, and 210 may only be used in conjunction with specific antivirus software applications. Moreover, since each antivirus software application maintains a kernel mode filter to perform essentially the same task, the computer system suffers the performance burden of having duplicative code simultaneously loaded in memory.

Unfortunately, the prior art process illustrated in FIG. 2 of providing antivirus software applications access to data associated with an I/O request also has the disadvantage of potentially hindering the removal of malware from a computing device. When two or more antivirus software applications are installed on the same computing devices, data conflicts are known to occur. For example, two antivirus software applications may determine that a file stored on a computing device is infected with malware. The first antivirus software application may attempt to "disinfect" the file by deleting file data. However, the second antivirus software application will typically be notified when the first antivirus software application makes the attempt to delete the file data. In this instance, the second antivirus software application may be configured to prevent any access to the infected file. Also, the first antivirus software application may be configured to prevent other applications, such as the second antivirus software application, from accessing the infected file. Obviously, in this situation, malware cannot be deleted by either the first antivirus software application or the second antivirus software application.

Figure 3:
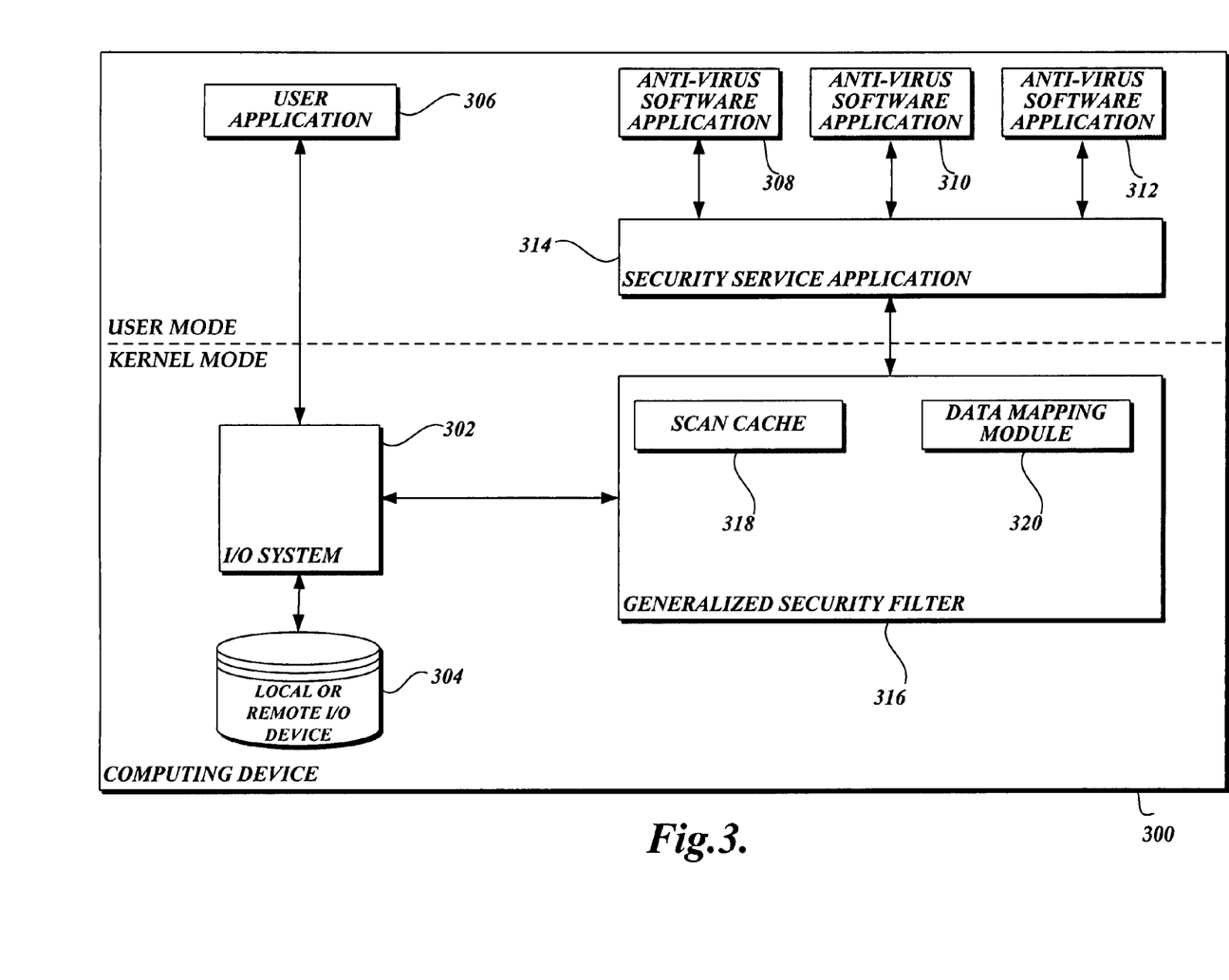
FIG. 3 is a block diagram of the components of a computing device that includes antivirus software applications suitable to identify malware in accordance with the present invention.

FIG. 3 is a block diagram suitable to illustrate the process of providing antivirus software applications with access to data associated with an I/O request in accordance with the present invention. The following is intended to provide an exemplary overview of one suitable computing device 300 in which the present invention may be implemented. The computing device 300 illustrated in FIG. 3 includes several components that may operate in a similar manner as components of like name described above with reference to FIG. 2. The computing device 300 includes an I/O system 302, an I/O device 304, a user application 306, antivirus software applications 308, 310, and 312, a security service application 314, and a generalized security filter 316 that includes a scan cache 318 and a data mapping module 320. The software implemented routines implemented by the present invention are contained in the security service application 314 and the generalized security filter 316 that includes the scan cache 318 and the data mapping module 320. As illustrated in FIG. 3, the security service application 314 executes in user mode and the generalized security filter 316 executes in kernel mode. Generally described, the routines implemented by the present invention provide a way for user-mode applications, such as antivirus software applications 308, 310, and 312, to access data associated with I/O requests scheduled to be satisfied by the I/O system 302. As illustrated in FIG. 3, antivirus software applications 308, 310, and 312 may function without using a kernel mode filter. Also, the computing device 300 may be used to aggregate the knowledge base of multiple antivirus software applications to scan data and determine if the data is infected with malware. Even though FIG. 3 and the accompanying text uses antivirus software applications to describe embodiments of the present invention, the software-implemented routines of the present invention may be used in conjunction with other types of applications. Similarly, the software implemented routines of the present invention may communicate with services that perform specific functions instead of applications. Thus, components of the computing device 300 illustrated in FIG. 3 should be construed as exemplary and not limiting.

As mentioned above, some of the software implemented routines of the present invention are located in the generalized security filter 316. In general terms describing one embodiment of the present invention, the generalized security filter 316 intercepts I/O requests made from user applications, such as user application 306. In response, the generalized security filter 316 performs routines designed to prevent the spread or execution of malware in the computing device 300. More specifically, the generalized security filter 316 communicates with the security service application 314 (described below) to cause the antivirus software applications to analyze a file associated with the request and determine whether the file contains malware. If malware is detected, the generalized security filter 316 is operative to communicate with the I/O system 302 and prevents a request from being satisfied.

As illustrated in FIG. 3, the generalized security filter 316 includes a scan cache 318 that improves the speed in which the present invention analyzes I/O requests intercepted from the I/O system 302. For example, as known to those skilled in the art and others, user applications will frequently make successive I/O requests directed to the same file. In this instance, the present invention may intercept a first I/O request and cause the antivirus software applications 308, 310, and 312 to scan the file and validate that the file is not infected with malware. In instances when the file is not infected, successive I/O requests do not trigger a scan of the file. Instead, the scan cache 318 tracks the status of files with regard to whether the files are infected with malware so that unnecessary scans are not performed. Files are categorized as being (1) known malware, (2) known safe, or (3) unknown. Since scanning a file is a resource-intensive process, preventing unnecessary scans improves the speed of the present invention. As will be described in further detail below, the scan cache 318 may be used in conjunction with other systems that track the state of files in addition to a system designed to prevent the spread or execution of malware. For example, some software applications allow users to "back up" or save data to a secondary hardware device. In this instance, the software application tracks the state of each file on a computing device with regard to whether the secondary hardware device has the most recent version of the file. The scan cache 318 may be used in conjunction with this type of system to track the state of files on a computing device.

The generalized security filter 316 includes a data mapping module 320 that improves the reliability and speed in which antivirus software applications 308, 310, and 312 are able to scan a file. Typically, when modern antivirus software applications intercept a file open operation, a second file handle is opened that is used to read file data. However, as known to those skilled in the art and others, a file may be "locked" to prevent multiple applications from simultaneously accessing the file. An antivirus software application may not be able to read the data in this instance when another application "locked" the file. Further, opening a new handle may prevent another application from opening the file, which has caused application failure in the prior art. However, the data mapping module 320 provides applications, such as antivirus software applications 308, 310, and 312, with access to file data without requiring the creation of a second file handle. Instead, the data mapping module 320 provides applications with access to a low-level object from which file data may be read. Access to the low-level object is available regardless of whether another application has "locked" the file. Also, creation of the second file handle requires substantial computational resources. Thus, allowing antivirus software applications to read file data using a low-level object improves the speed in which the antivirus software applications are able to perform scans for malware. As will be described in further detail below, the data mapping module 320 may be used in conjunction with other systems that read file data. For example, some software applications encrypt a file before the file is stored on a hardware device and decrypt the file when retrieval from the hardware device occurs. In this instance, the data mapping module 320 may be used to provide an efficient way for an encryption application to access data in the file.

As illustrated in FIG. 3, the computing device 300 includes a security service application 314 that, among other things, acts as an interface to antivirus software applications installed on the computing device 300. The security service application 314 allows antivirus software applications to register and create a scanning profile. The scanning profile identifies the I/O requests that an antivirus application finds "interesting." For example, a scanning profile may indicate that an antivirus software application will perform a scan when an I/O request is directed to a file that has an "unknown" state with regard to being infected with malware. Alternatively, a scanning profile may be defined so that an antivirus software application performs a scan when certain types of I/O requests are generated. In any event, antivirus software applications register with the security service application 314 and create a profile that defines the circumstances in which a scan will be performed. The security service application 314 is responsible for scheduling scans between the different registered antivirus software applications.

Implementations of the present invention are not limited to the exemplary computing device 300 shown in FIG. 3. For example, FIG. 3 and the accompanying text describe antivirus software applications 308, 310, and 312 that execute in user mode. However, the software implemented routines of the present invention may be configured to communicate with antivirus software filters that execute in kernel mode. Also, the computing device 300 is shown as receiving I/O requests from the user application 306. However, as known to those skilled in the art and others, I/O requests may be received from other sources, such as protocols used for communication between remote computing devices. Moreover, the I/O device 304 is illustrated as being a hardware device that is a component of the computing device 300. However, the I/O device 304 may be a remote hardware device connected to the computing device 300 through a network connection. Alternatively, the I/O request may not be directed to a hardware device. Instead, an I/O request may be directed to an object that is capable of being accessed using a create file command, including, but not limited to, pipes, communication resources, disk devices, consoles, mail slots, etc. Thus, the components of the computing device 300 illustrated in FIG. 3 should be construed as exemplary and not limiting.

Figure 4:
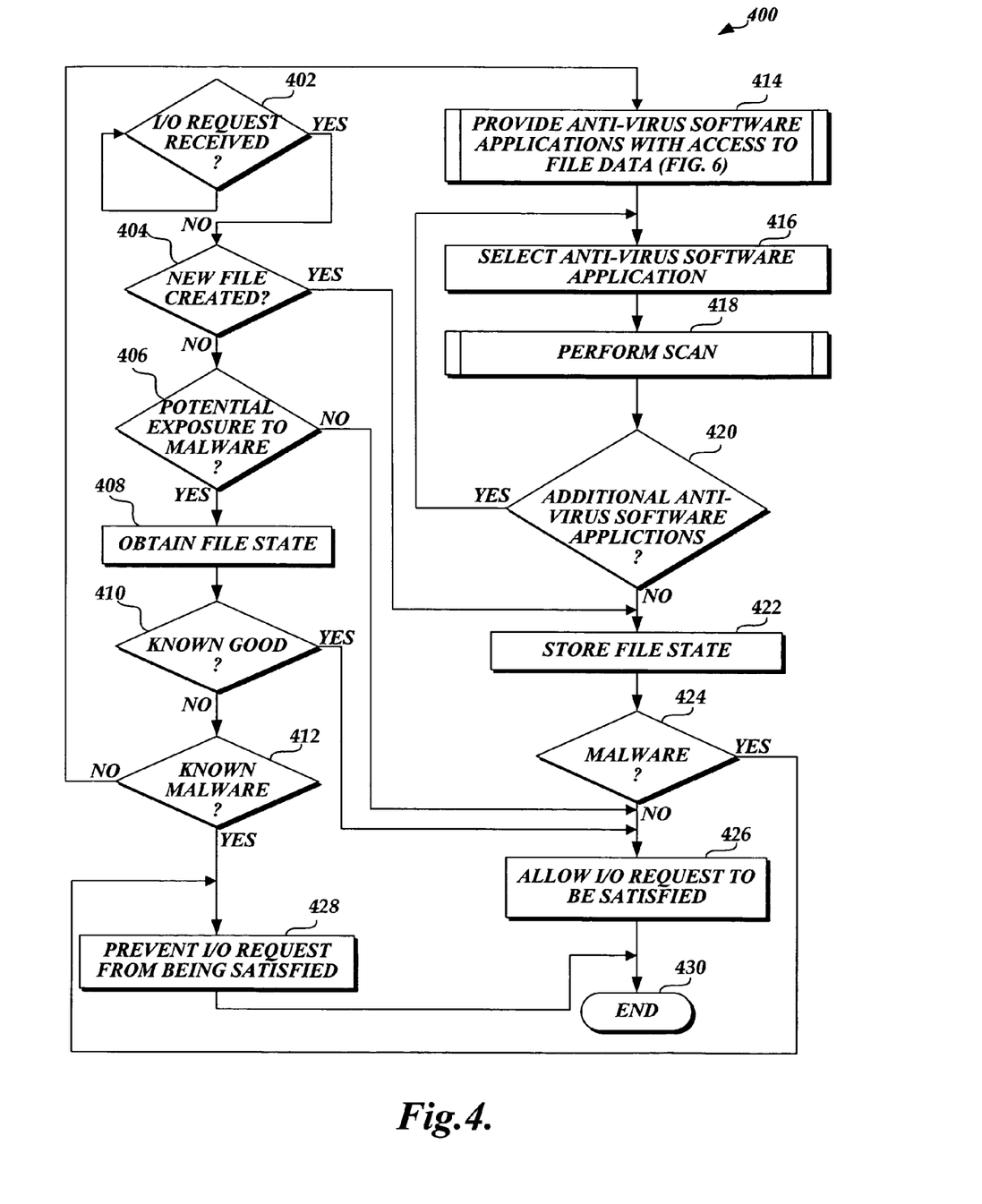
FIG. 4 is a flow diagram illustrating one exemplary embodiment of a method that aggregates the knowledge base of a plurality of antivirus software applications in accordance with the present invention.

FIG. 4 is a flow diagram of one exemplary method 400 designed to aggregate the knowledge base of a plurality of antivirus software applications. In summary, the method 400 exposes antivirus software applications to I/O requests through a common information model. When an I/O request is generated, the method 400 determines if a scan by one or more antivirus software applications installed on a computing device is necessary. In instances where a scan is necessary, the method 400 identifies antivirus software applications that are "interested" in the type of I/O request that was generated. Through the common information model, one or more antivirus software applications may perform a scan to determine if malware is associated with the I/O request. With continuing reference to FIGS. 1-3 and the accompanying descriptions, an exemplary method 400 that aggregates the knowledge base of a plurality of antivirus software applications illustrated in FIG. 4 will now be described.

At decision block 402, the method 400 remains idle and waits for an I/O request that is typically received by a kernel mode component of an operating system, such as the I/O system 302 (FIG. 3). As will be appreciated by those skilled in the art, I/O requests may be generated through a variety of different mechanisms. For example, a user of a word processing program may cause an "open file" command to be issued from a drop-down menu or other graphically based input system. To satisfy the "open file" command, the word processing program may issue an API call that requires obtaining file data from a memory device. By way of another example, a user of a Web browser program may issue a command to download a file from a remote computer. To satisfy the command, the Web browser program may issue an API call to store a data stream on a hardware device, such as the I/O device 304 (FIG. 3). When an I/O request is generated, the I/O system 302 interacts with hardware devices to satisfy the request. However, the method 400 intercepts I/O requests before they are satisfied by the I/O system 302 to prevent the execution and/or spread of malware.

At decision block 404, the method 400 determines whether the I/O request received at block 402 is a command that causes a new file to be created. One type of I/O request that may be intercepted at block 402 causes a new file to be created. This type of request cannot expose a computing device to malware. As described below at block 422, a command that causes a new file to be created is handled differently than other I/O requests received by the method 400. A command that causes a new file to be created may be generated using any one of a number of different commands available from modem operating systems. For example, in the context of a Windows® operating system, a new file may be created using APIs specifically designed to create a new file, such as the "CreateFile" API. Alternatively, a new file may be created in certain circumstances using other APIs, such as the open, overwrite, and supersede APIs. If the request received at block 404 is a command that causes a new file to be created, the method 400 proceeds to block 422 described below. Alternatively, if the request is not a command that causes a new file to be created, the method 400 proceeds to block 406.

At decision block 406, the method 400 determines whether the I/O request intercepted at block 402 has the potential to expose a computing device to malware. As known to those skilled in the art and others, certain I/O requests may not have the potential to expose a computing device to malware. For example, if an I/O request is an "open file" command and the specified file does not contain any data, satisfying the command cannot expose a computing device to malware. Similarly, the I/O request received at block 402 may be a command to open or close a directory. In this instance, the I/O request cannot expose a computing device to malware. It will be appreciated by those skilled in the art and others that other types of I/O requests do not have the potential to expose a computing device to malware. Therefore, the examples described above should be construed as exemplary and not limiting. If the request received at block 402 does not have the potential to expose a computing device to malware, the method 400 proceeds to block 426 described below. Alternatively, if the request received at block 402 does have the potential to expose a computing device to malware, the method 400 proceeds to block 408.

At block 408, the method 400 queries a database, such as the scan cache 318, and identifies the state of the file that is the object of the I/O request received at block 402. As described in further detail below, when one or more antivirus software applications scans a file for malware, a variable is associated with the file. The variable represents one of three possible states, including (1) known malware, (2) known good, or (3) unknown.

Figure 5:
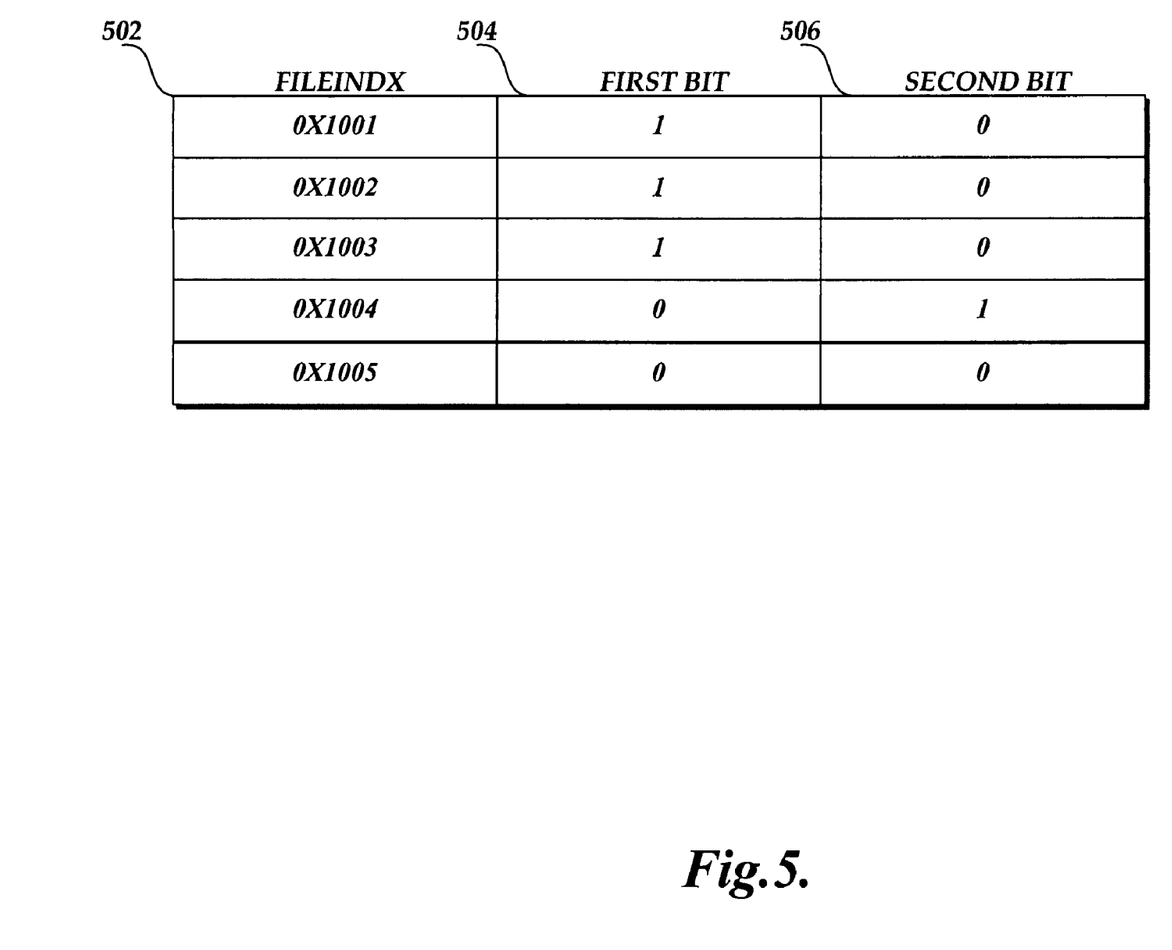
FIG. 5 is a pictorial depiction of a scan cache suitable to store and recall data in conjunction with the method depicted in FIG. 4.

For illustrative purposes and by way of example only, the contents of a sample scan cache 318 is shown in FIG. 5. As illustrated, the scan cache 318 consists of three columns, each of which contains multiple entries. The columns are identified as FILEINDX 502, FIRST BIT 504, and SECOND BIT 506. The FILEINDX 502 field contains a value that may be used to uniquely identify a file. As known to those skilled in the art and others, memory devices are typically partitioned into logical units referred to as volumes. Each volume has a central location where information about files on the volume is stored. For example, the Windows® NT File System ("NTFS") maintains a master file table ("MFT") that contains a record for each file on a volume. When a file is created, a new record for the file is stored in the MFT and a predetermined amount of space is allocated to store file attributes. For example, each file is assigned a unique file index that represents the file's location in the MFT. As described in further detail below, when a file is scanned by one or more antivirus software applications in accordance with present invention, the index value associated with the file in the MFT is entered in the FILEINDX 502 field of the scan cache 318. The FIRST BIT 504, and SECOND BIT 506 fields each store a value that collectively identifies the state of the file. For example, both the FIRST BIT 504 and SECOND BIT 506 fields contain a value that is either a "0" or a "1." In one embodiment of the present invention, if the FIRST BIT 504 field contains a "1" and the SECOND BIT 506 field also contains a "0," then the state of the file is "known malware." Alternatively, if the FIRST BIT 504 field contains a "0" and the SECOND BIT 506 field contains a "1," then the state of the file is "known good." Also, if the FIRST BIT 504 field contains a "0" and the SECOND BIT 506 field contains a "0," then the state of the file is "unknown." Although FIG. 5 illustrates a scan cache 318 that has specific attributes, those skilled in the art will appreciate that the scan cache 318 may operate with more or fewer than all of the listed attributes.

Conventional techniques for tracking the state of a file are error-prone and resource intensive when compared to the scan cache 318. For example, one known technique for tracking whether a file is infected with malware uses a hash table. When an I/O request is intercepted, the hash table is searched using a string-based file name as the hash key. However, file names do not always uniquely identify a file. For example, a file may be associated with two or more file names when a user creates a "link" to reference the file. In this instance, a hash table may contain multiple entries for the same file. As a result, antivirus software applications may perform unnecessary scans when a file is referenced by two or more file names. As described above, the scan cache 318 uses a unique file index obtained from the MFT to identify a file that prevents duplicative scans from occurring. Also, computing a hash key or searching for a string-based file name is resource intensive when compared to querying bits from a bitmap. For example, hash tables typically consume enough memory that entries in a hash table are eventually removed to accommodate new files. However, entries in the scan cache 318 require a sufficiently small amount of memory that the entries will not be removed to accommodate new entries.

As mentioned above, the scan cache 318 may be used in conjunction with other systems to track the state of one or more files. By way of example only, the scan cache 318 may be implemented in conjunction with (1) "backup" applications to track the state of files with regard to their storage on a secondary hardware device, (2) encryption/decryption applications to track whether files are encrypted, (3) and content filtering applications to track whether files contain inappropriate content. As known to those skilled in the art and others, bits for storing additional data may be added to the scan cache 318 to accommodate the needs of these types of systems.

Returning to FIG. 4, at decision block 410 the method 400 determines if the state associated with a file is "known good" or free from a malware infection. In an exemplary embodiment of the present invention, the determination regarding whether a file is "known good" is made by analyzing data contained in a database, such as bit information contained in the scan cache 318. Since querying a database and analyzing information associated with a file index may be performed using techniques generally known in the art, description of the technique used by the present invention is not provided here. If a file is identified as "known good" the method 400 proceeds to block 426 described below. Alternatively, if the file is associated with a different state than "known good" the method 400 proceeds to block 412.

At decision block 412 the method 400 determines if the state associated with the file is "known malware." Similar to the instance where the file is identified as being "known good," the determination of whether a file is "known malware" is made by analyzing data contained in a database, such as bit information contained in the scan cache 318. If the file state is identified as "known malware" the method 400 proceeds to block 428 described below. Alternatively, if the file is associated with an unknown state the method 400 proceeds to block 414.

At block 414 the method 400 provides antivirus software applications executing in user mode with access to file data. If block 414 is reached, the state associated with the file is "unknown" and the method 400 will cause one or more antivirus software applications to scan the file that is the object of the I/O request intercepted at block 402. The present invention provides antivirus software applications with an efficient way to access file data so that a scan for malware may be performed quickly. One embodiment of a method for providing antivirus software applications with access to file data is described below with reference to FIG. 6.

At block 416, the method 400 selects an antivirus software application that will perform a scan of the file that is the object of the I/O request received at block 402. As described previously with reference to FIG. 3, aspects of the present invention allow antivirus software applications to register and create a scanning profile. The scanning profile defines I/O requests that are "interesting" to an antivirus software application. The method 400 checks the scanning profile of antivirus software applications installed on a computing device and sequentially selects the antivirus software applications that are "interested" in the intercepted I/O request.

At block 418, the method 400 causes the selected antivirus software application to scan data and determine if the file that is the object of the I/O request received at block 402 is infected with malware. As described above, antivirus software applications typically match patterns of data to a malware "signature" when determining if an infection exists. However, increasingly, antivirus software applications are using proactive malware detection techniques. For example, some antivirus applications emulate program behavior by causing data to "execute" inside a virtual operating environment. If the misuse/abuse of resources in the virtual operating environment is detected, then an antivirus software application determines that a file is infected with malware. In any event, at block 418, the selected antivirus software application obtains file data and performs actions to determine if file data is infected with malware. As described in further detail below with reference to FIG. 6, file data may be obtained using a common information model that is available to registered antivirus software applications.

In addition to making a determination whether a malware infection exists, an antivirus software application may perform corrective action at block 418. As known to those skilled in the art and others, modern antivirus software applications may be able to delete data identified as malware or otherwise correct a malware infection. In the event that malware is detected at block 418, then the selected antivirus software application is allowed to take corrective action. Since only one antivirus software application may be selected at a time, any corrective action taken at block 418 is performed without the possibility of data conflicts. Stated differently, the method 400 schedules the corrective action taken by antivirus software application to occur sequentially, which means that data views are coherent with respect to other antivirus software applications.

At decision block 420, the method 400 determines if any additional antivirus software applications will be selected. As described previously, the method 400 may be used to aggregate the knowledge base of a plurality of antivirus software applications to detect the presence of malware. If additional antivirus software applications will not be selected, the method 400 proceeds to block 422 discussed below. Conversely, if additional antivirus software applications will be selected, the method 400 proceeds back to block 416 and blocks 416 through 420 repeat until all of the antivirus software applications "interested" in the I/O request intercepted at block 402 are able to perform a scan.

At block 422, the state of a file is stored in a database, such as the scan cache 318. As described above, in certain instances, the method 400 may cause antivirus software applications to scan file data and make a determination whether a file is infected with malware. In one exemplary embodiment of the present invention, if one or more antivirus software applications detects the presence of malware and is unable to correct the infection, the file is marked as "known malware" in the scan cache 318. In this embodiment, if none of the antivirus software applications detects the presence of malware, the file is marked as "known good" in the scan cache 318. It will be appreciated by those skilled in the art and others that there are other possible embodiments for making a determination that a file is infected with malware. For example, the method 400 may require that a majority of antivirus software applications installed on a computing device detect malware before a file is identified as "known malware" in the scan cache 318. More generally, the method 400 may be implemented with a system that calculates a weighted value for the result set generated by the antivirus software applications. In this instance, if the weighted value is over a threshold amount, then the file is marked as "known malware" in the scan cache 318. Since systems that calculate weighted values based on input received from an application are generally known in the art, further description of these systems is not provided here.

As described above at block 404, the I/O request intercepted at block 402 may be a command that causes a new file to be created. In this instance, the command can be satisfied without exposing a computing device to malware. At block 422, the state of the file that is the subject of the command is identified as "known good" in the scan cache 318. As described above at block 408, in one embodiment of the present invention, a unique file index value is obtained from the MFT and used to identify files in the scan cache 318. However, when a file is deleted from a computing device, the MFT may reassign the file index value associated with the deleted file to a new file. The present invention does not change the state of a file as recorded in the scan cache 318 when a file is deleted. Instead, when a command that causes a new file to be created is received, the method simply overwrites the state of the deleted file with the state of the file that is the object of the command.

As described above, the method 400 causes the state of a file to be stored in a database such as the scan cache 318. In some instances, additional administrative procedures may be performed at block 422 to enable the scan cache 318 to accommodate growth in the file system. For example, in one embodiment of the present invention, when an I/O request is directed to a previously unidentified file that does not maintain an entry in the scan cache 318, a larger scan cache is created. The contents of the smaller scan cache 318 are copied to the larger scan cache along with the state of the previously unidentified file. An optimization of this embodiment causes the memory allocated to the scan cache 318 to grow by a predetermined percentage above the minimum required to accommodate the previously unidentified file for additional files that are yet to be the object of an I/O request.

At decision block 424, the method 400 determines if the state associated with a file is "known malware." The method 400 reaches block 424 when a command that causes a new file to be created is intercepted or a file with a state that is "unknown" is scanned by one or more antivirus software applications. In either instance, the state associated with the file is stored in a database such as the scan cache 318. Thus, determining if a file is infected with malware at decision block 424 is made by recalling previously stored data. If the file state is identified as malware, the method 400 proceeds to block 428 described below. Alternatively, if the file is not identified as malware the method 400 proceeds to block 426.

At block 426, the method 400 returns program execution back to a component of the operating system such as the I/O system 302 (FIG. 3). As described previously, the method 400 intercepts I/O requests before they are satisfied to prevent the execution and/or spread of malware. If block 426 is reached, the I/O request intercepted at block 402 is either not capable of infecting a computing device with malware or involves data that was scanned and identified as not being malware by antivirus software applications installed on a computing device. In either instance, satisfying the I/O request will not result in the execution and/or spread of malware. Thus, after program execution is returned to the I/O system 302, the I/O request is satisfied in accordance with the prior art. Then, the method 400 proceeds to block 430, where it terminates.

At block 428, the method 400 returns program execution back to a component of the operating system such as the I/O system 302. However, if block 428 is reached, the I/O request intercepted at block 402 may result in the execution and/or spread of malware. Thus, after program execution is returned to the I/O system 302, the I/O request fails and the computer user is informed of the malware infection. Then the method 400 proceeds to block 430, where it terminates.

Implementations of the present invention are not limited to the exemplary method 400 shown in FIG. 4. For example, the method 400 is illustrated as having a discrete beginning and end. However, in actual embodiments of the present invention, I/O requests are intercepted in a continuous process. When sufficient information exists to believe that an I/O request will result in the execution and/or spread of malware, then the method 400 causes the I/O request to fail. Also, the present invention is not limited to the examples provided above. For example, the method 400 was primarily described in the context of scanning file data. However, those skilled in the art will appreciate that the method 400 may be used to scan other units of data without departing from the scope of the present invention.

Figure 6:
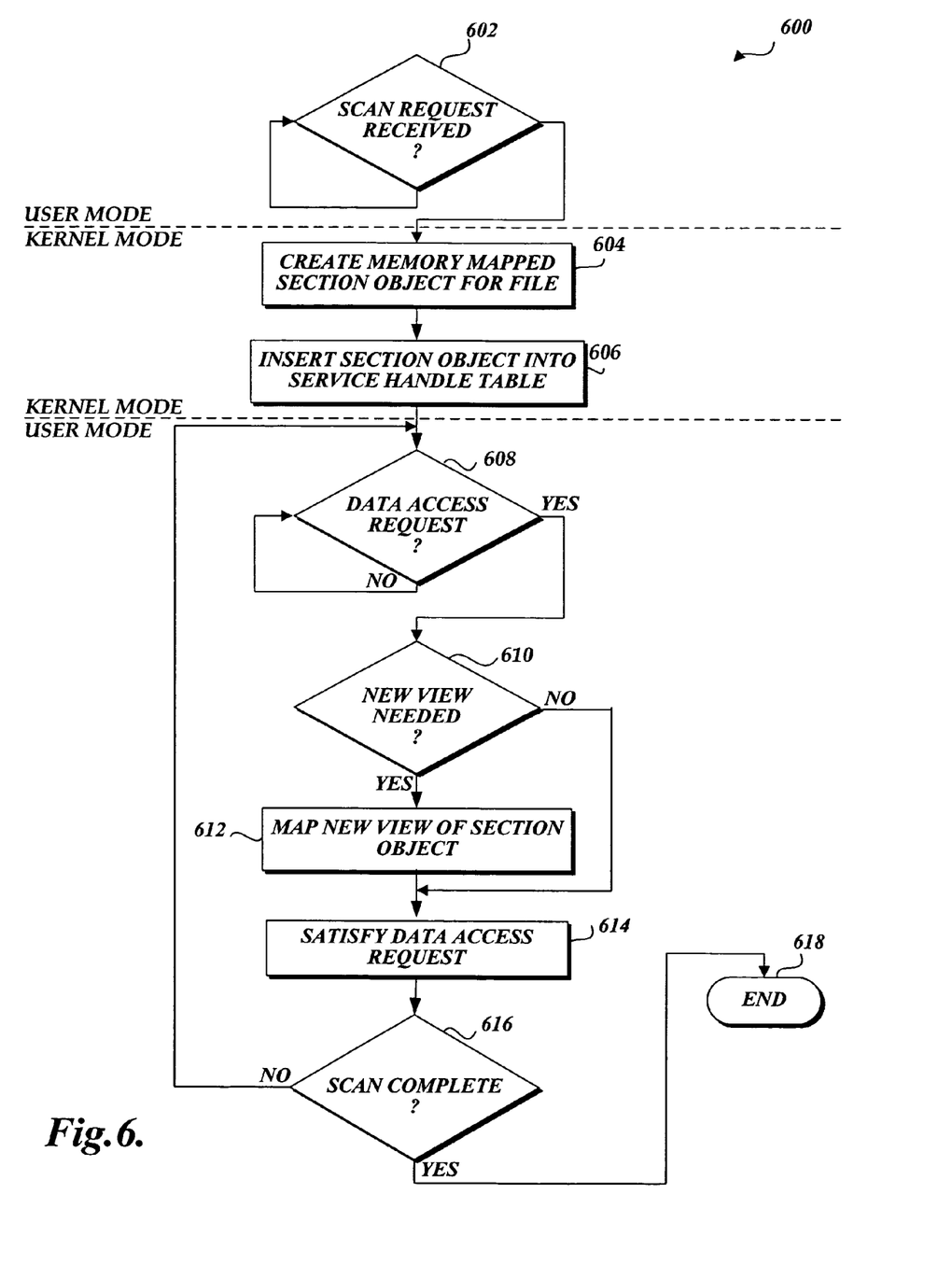
FIG. 6 is a flow diagram illustrating one exemplary embodiment of an access method that may be used in conjunction with the method depicted in FIG. 4 to provide antivirus software applications with access to file data in accordance with the present invention.

FIG. 6 is a flow diagram of one exemplary access method 600 that may be used in conjunction with the method 400 described above with reference to FIG. 4 to provide antivirus software applications with access to file data in a highly optimized manner. In summary, the method 600 includes creating a section object that will be used by one or more antivirus software applications to perform a scan. Then a user mode application that interfaces with the antivirus software applications is provided with information necessary to access the section object. Finally, a view of the section object is created that allows one or more antivirus software applications to perform basic file system operations. With continuing reference to FIGS. 1-5 and the accompanying descriptions, an exemplary access method 600 illustrated in FIG. 6 will now be described.

At decision block 602, the access method 600 remains idle until a scan request is received. As described previously, the security service application 314 (FIG. 3) acts as an interface to antivirus software applications installed on the computing device 300. An antivirus software application may create a scanning profile that defines the circumstances in which the antivirus software application will perform a scan. At block 602, the security service application 314 (FIG. 3) receives a scan request from an antivirus software application. Since communicating a request between two user mode applications may be implemented using techniques generally known in the art, further description of these techniques is not provided here.

At block 604, a section object of the file that will be scanned by one or more antivirus software applications is created. As known to those skilled in the art and others, section objects allow kernel and user mode applications to share data. In one exemplary embodiment of the present invention, the security service application 314 makes a request to the generalized security filter 316 to create a section object of the file that will be scanned. As illustrated in FIG. 2, before the file mapping section object is created, the operating system 104 changes from user mode to kernel mode. More specifically, the operating system 104 changes from user mode to kernel mode after the security service application 314, which executes in user mode, makes the request to the generalized security filter 316 which executes in kernel mode. When the change to kernel mode is complete, the generalized security filter 316 responds to the request by identifying the file that will be scanned and invoking a function that causes the file mapping section object to be created.

At block 606, information necessary to access the file that will be scanned is made available to a user-mode application. More specifically, the file mapping section object created at block 604 is inserted by the generalized security filter 316 into the object table of the security service application 314. As known to those skilled in the art and others, modern operating systems typically execute programs inside a predetermined domain. For example, in some operating systems, a program is only able to access objects referenced in a data structure unique to the program known as an object table. By inserting the section object created at block 604 into the object table associated with the security service application 314, the section object created at block 604 is made available to the security service application 314. As illustrated in FIG. 2, after the file mapping section object is inserted into the object table of the security service application 314, the operating system 104 changes from kernel mode to user mode.

At decision block 608, the access method 600 remains idle and waits for an antivirus software application to request file data. As described previously, when an I/O operation is intercepted, one or more antivirus software applications may interact with a common information model to schedule a scan. In order to complete the scan, an antivirus software application may need to perform basic file system operations. For example, typically, an antivirus software application will "read" file data and compare the data to known malware signatures. In accordance with the present invention, an antivirus software application is able to perform basic file system operations using a common information model available to applications registered with the security service application 314. In one embodiment of the present invention, the common information model is available to registered applications in the form of a set of APIs. In any event, at decision block 608, the access method 600 remains idle and waits for an antivirus software to request file data.

At decision block 610, the access method 600 determines if a view of the file that will be scanned needs to be mapped into the memory space of the security service application 314. To accomplish efficient use of the security service application's 314 virtual address space, especially as multiple scans of unique files may be occurring simultaneously, a "view" of a file may be mapped into the memory space of the application that allows an application to access portions of file data. Since all file data may not be loaded in the memory space of an application at one time, new views are mapped when data not available from the current view is requested. If the data requested at block 608 is not available from a view mapped in the memory space of the security service application 314, then the access 600 method determines that a new view needs to be mapped and proceeds to block 612. Conversely, if the data requested at block 608 is accessible from a view mapped into the memory space of the security service application 314, then the access method 600 proceeds to block 614 described below.

At block 612, a view of the section object created at block 604 is mapped, allowing a user-mode application, such as the security service application 314, to satisfy requests for file data. The security service application 314 obtains data provided by the generalized security filter 316 that identifies the file that will be scanned. If a view is already mapped in the memory space of the security service application 314 the access method 600 makes an API call to the operating system 104 that causes the current view to be removed. Then, the security service application 314 makes another API call to the operating system 104 that causes a new view to be mapped. In response, the operating system 104 maps a view for the file from which the requested data may be accessed. In the context of Windows® operating systems, files may be mapped in and out of an application's memory space using the "MapViewOfFile$_{(\ )}$" and "UnMapViewOfFile$_{(\ )}$" APIs. However, the example provided herein should be construed as exemplary and not limiting.

At block 614, the data requested at block 608 is communicated to the antivirus software application where the request originated. When the necessary view is mapped (at block 612) into the memory space of the security service application 314, systems are able to transmit the data to the requesting antivirus software application using methods generally known in the art.

At decision block 616, the access method 600 determines if the antivirus software application that generated the scan request received at block 602 has completed accessing file data. As described previously, the security service application 314 serves as an interface by providing a basic set of file system operations to antivirus software applications installed on a computing device. When an antivirus software application finishes scanning a file, the application communicates to the security service application 314 that the scan is complete and the access method 600 proceeds to block 618, where it terminates. Conversely, if the antivirus software application has not finished scanning the file and continues accessing file data, then the access method 600 proceeds back to blocks 608 through 616 until the antivirus software application has finished scanning the file.

The access method 600 may be used in conjunction with other systems to provide a very fast way to perform basic file system operations. By way of example only, the access method 600 may be implemented in conjunction with (1) encryption/decryption applications to read and write data to a file, and (2) content filtering applications to read file data and determine if the file data contains inappropriate material. However, since the access method 600 may be used by any type of application to perform basic file system operations, the examples provided herein should be construed as exemplary and not limiting.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computing device that includes a plurality of user mode applications, a kernel mode application, and a file, a computer-implemented method of sequentially providing more than one user mode applications with access to data in the file, the method comprising:
 (a) creating a common interface for the plurality of user mode applications at said computing device that includes said kernel mode application, wherein the plurality of user mode applications register with the common interface and wherein the common interface schedules requests from the plurality of user mode applications to access the data in the file;
 (b) providing a generalized security filter to obviate the need of loading multiple disparate filters in the kernel in order to access I/O data in the file for each of different user mode applications by causing the kernel mode application to create a file mapping section object of the file when a request is received from each of the more than one registered user mode applications;
 (c) providing the common interface with information necessary for each of the more than one registered user mode applications to access the file mapping section object; and
 (d) creating a view of the file by making available the data in the file necessary to fulfill the request.

2. The method of claim 1, further comprising transmitting the data in the file to each of the more than one registered user mode applications in response to the request, wherein the request is made as an application program interface call.

3. The method of claim 2, wherein each of the more than one registered user mode applications gains access to data in the file without a data conflict.

4. The method of claim 1, wherein the common interface executes in user mode and is communicatively connected to the kernel mode application.

5. The method of claim 1, wherein the kernel mode application communicates with a component of an operating system of the computing device that satisfies input and output requests.

6. The method of claim 5, wherein the input and output requests are directed to the file.

7. The method of claim 1, wherein the more than one registered user mode applications are antivirus software applications.

8. The method of claim 7, wherein the common interface allows each of the more than one antivirus software applications to create a scanning profile to request access to the data in the file.

9. The method of claim 8, wherein the scanning profile defines instances when each of the more than one antivirus software applications will read data in the file.

10. The method of claim 7, wherein each of the more than one antivirus software applications compares data in the file to signatures characteristic of malware.

11. The method of claim 8, wherein the scanning profile defines instances when each of the more than one antivirus software applications will disinfect the computing device of a malware infection.

12. The method of claim 1, wherein causing the kernel mode application to create a file mapping section object includes making an application program interface call to an operating system of the computing device.

13. The method of claim 12, wherein providing the common interface with information necessary to access the file mapping section object includes inserting the file mapping section object into an object table associated with the common interface.

14. The method of claim 1, wherein creating a view of the file includes removing a current view of the file in a memory space available to the common interface.

15. A computer-readable storage medium bearing computer-executable instructions that, when executed in a computing device that includes a plurality of user mode applications, a kernel mode application, and a file, carries out a method of sequentially providing more than one user mode applications with access to data in the file, comprising:

(a) creating a common interface for the plurality of user mode applications at said computing device that includes said kernel mode application, wherein the plurality of user mode applications register with the common interface and wherein the common interface schedules requests from the plurality of user mode applications to access the data in the file;

(b) providing a generalized security filter to obviate the need of loading multiple disparate filters in the kernel in order to access I/O data in the file for each of different user mode applications by causing the kernel mode application to create a file mapping section object of the file when a request is received from each of the more than one registered user mode applications;

(c) providing the common interface with information necessary for each of the more than one registered user mode applications to access the file mapping section object; and (d) creating a view of the file by making available the data in the file necessary to fulfill the request.

16. The computer-readable storage medium as recited in claim 15, further comprising transmitting the data in the file to each of the more than one registered user mode applications in response to the request, wherein the request is made as an application program interface call.

17. The computer-readable storage medium as recited in claim 16, wherein each of the more than one registered user mode applications is provided with exclusive access to the data in the file when the request is made.

18. The computer-readable storage medium as recited in claim 15, wherein each of the more than one registered user mode applications gains access to data in the file without a data conflict.

19. The computer-readable storage medium as recited in claim 18, wherein the kernel mode application communicates with a component of an operating system of the computing device that satisfies input and output requests.

20. The computer-readable storage medium as recited in claim 19, wherein the input and output requests are directed to the file.

21. The computer-readable storage medium as recited in claim 15, wherein the more than one registered user mode applications are antivirus software applications.

22. The computer-readable storage medium as recited in claim 21, wherein the common interface allows each of the more than one antivirus software applications to create a scanning profile to request access to the data in the file.

23. The computer-readable storage medium as recited in claim 22, wherein the scanning profile defines instances when each of the more than one antivirus software applications will read data in the file.

24. The computer-readable storage medium as recited in claim 21, wherein each of the more than one antivirus software applications compares data in the file to signatures characteristic of malware.

25. The computer-readable storage medium as recited in claim 22, wherein the scanning profile defines instances when each of the more than one antivirus software applications will disinfect the computing device of a malware infection.

26. The computer-readable storage medium as recited in claim 15, wherein causing the kernel mode application to create a file mapping section object includes making an application program interface call to an operating system of the computing device.

27. The computer-readable storage medium as recited in claim 26, wherein providing the common interface with information necessary to access the file mapping section object includes inserting the file mapping section object into an object table associated with the common interface.

28. The computer-readable storage medium as recited in claim 15, wherein creating a view of the file includes removing a current view of the file in the memory space available to the common interface.

* * * * *